(12) United States Patent
Shaw

(10) Patent No.: US 9,438,308 B2
(45) Date of Patent: Sep. 6, 2016

(54) ECHO CANCELLATION WITH QUANTIZATION COMPENSATION

(71) Applicant: Avago Technologies General IP (Singapore) Pte. Ltd., Singapore (SG)

(72) Inventor: David G. Shaw, Nazareth, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 134 days.

(21) Appl. No.: 14/074,026

(22) Filed: Nov. 7, 2013

(65) Prior Publication Data

US 2015/0055774 A1 Feb. 26, 2015

Related U.S. Application Data

(60) Provisional application No. 61/896,224, filed on Oct. 28, 2013, provisional application No. 61/868,229, filed on Aug. 21, 2013.

(51) Int. Cl.
*H04B 3/23* (2006.01)
*H04M 9/08* (2006.01)

(52) U.S. Cl.
CPC .............. *H04B 3/235* (2013.01); *H04M 9/082* (2013.01)

(58) Field of Classification Search
None
See application file for complete search history.

(56) References Cited

U.S. PATENT DOCUMENTS

| | | | | |
|---|---|---|---|---|
| 4,912,758 | A | * | 3/1990 | Arbel .................... H04M 9/082 |
| | | | | 379/388.02 |
| 5,247,512 | A | * | 9/1993 | Sugaya et al. ................ 370/289 |
| 5,315,585 | A | * | 5/1994 | Iizuka et al. .................. 370/289 |
| 5,790,632 | A | * | 8/1998 | Antonio et al. ................... 379/3 |
| 6,912,209 | B1 | | 6/2005 | Thi et al. ....................... 370/286 |
| 6,996,231 | B2 | | 2/2006 | Kosanovic et al. ..... 379/406.09 |
| 7,020,278 | B2 | | 3/2006 | Farrell et al. ............ 379/406.05 |
| 7,450,713 | B2 | | 11/2008 | Laberteaux .............. 379/406.01 |
| 8,130,879 | B2 | | 3/2012 | Huang .......................... 375/346 |
| 2007/0092074 | A1 | * | 4/2007 | Takada ..................... 379/406.08 |

* cited by examiner

*Primary Examiner* — Fan Tsang
*Assistant Examiner* — Jeffrey Lytle

(57) ABSTRACT

An apparatus having a first circuit and a second circuit is disclosed. The first circuit is configured to generate a first intermediate signal by expanding a first input signal subjected to a quantization. The second circuit is configured to generate a second intermediate signal based on a second input signal. The second intermediate signal approximates an echo in the first input signal caused by the second input signal. The second circuit is also configured to generate a third intermediate signal by companding the second intermediate signal to compensate the quantization of the first input signal.

20 Claims, 8 Drawing Sheets

ECHO CANCELLATION WITH QUANTIZATION COMPENSATION

This application relates to U.S. Provisional Application 61/896,224, filed Oct. 28, 2013 and U.S. Provisional Application No. 61/868,229, filed Aug. 21, 2013, each of which are hereby incorporated by reference in their entirety.

FIELD OF THE INVENTION

The invention relates to echo cancellation in electrical telephone networks generally and, more particularly, to a method and/or apparatus for implementing an echo cancellation with quantization compensation.

BACKGROUND

Conventional echo canceller performances are constrained to only about 38 decibels (i.e., dB) maximum echo return loss enhancement (i.e., ERLE). The constraint results from a quantization noise created by a compression and subsequent expansion through either μ-law codecs or A-law codecs used in telephone networks. An International Telecommunication Union Telecommunication Standardization Sector (i.e., ITU-T) Recommendation G.168 uses measurement techniques to assess the performance of specific implementations of an echo canceller. The limits used in the recommendation suggest no anticipation of better performance than the 38 dB of cancellation.

SUMMARY

The invention concerns an apparatus having a first circuit and a second circuit. The first circuit is configured to generate a first intermediate signal by expanding a first input signal subjected to a quantization. The second circuit is configured to generate a second intermediate signal based on a second input signal. The second intermediate signal approximates an echo in the first input signal caused by the second input signal. The second circuit is also configured to generate a third intermediate signal by companding the second intermediate signal to compensate the quantization of the first input signal.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing an echo cancellation with quantization compensation that may (i) improve a match between an estimated echo and an actual echo, (ii) improve overall cancellation compared with common techniques, (iii) avoid degradation to a normal performance of the echo canceller and/or (iv) be implemented in one or more integrated circuits.

Some embodiments provide one or more techniques for improving performance of an echo canceller in the presence of either an A-law quantization or a μ-law quantization. The A-law quantization and the μ-law quantization are defined in an ITU-T Recommendation G.711. By using added functionality, a residual echo departing the echo canceller can be reduced below a normal maximum echo return loss enhancement of 38 decibels (e.g., dB). Experiments on simulations of the techniques have achieved echo return loss enhancements in the range of 45 dB to 50 dB. Under some circumstances, as much as 60 dB to 80 dB echo return loss enhancement has been achieved. Furthermore, the utilization of a nonlinear residual echo suppression at an output of the echo canceller can reduce or possibly eliminate the remaining echo under certain circumstances.

Echoes result from 2-to-4 wire terminations found on most connections in public switched telephone networks. By adding a companding (e.g., quantizing and expanding) component to a structure of the echo canceller, a resulting quantization of an estimated echo improves a match between the estimated echo and the actual echo. The improved match allows for better overall echo cancellation, generally beyond the signal to quantization ratios that limit common echo canceller performance.

Figure 1:
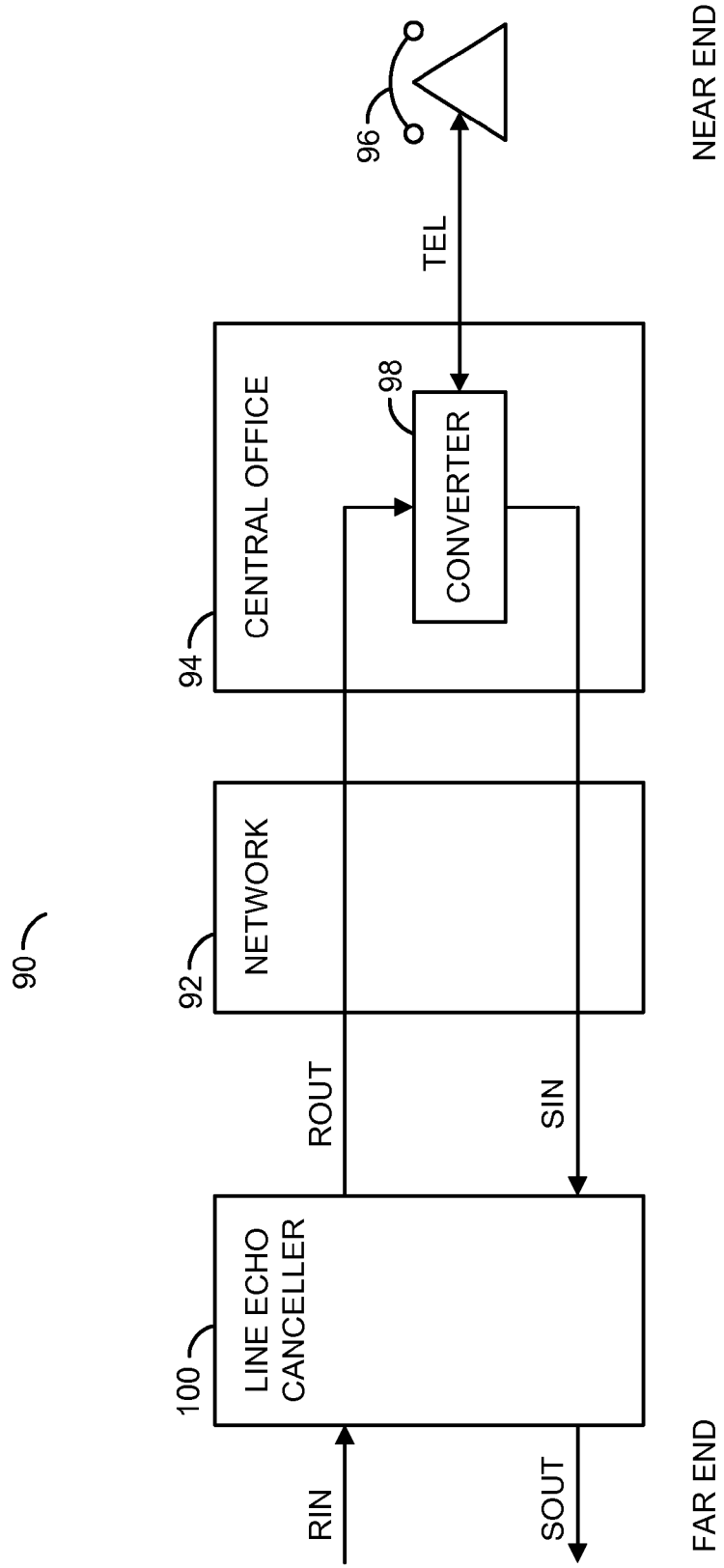
FIG. 1 is a block diagram of a system.

Referring to FIG. 1, a block diagram of an example implementation of a system 90 is shown. The system (or architecture) 90 generally comprises a network (or transmission line) 92, a block (or circuit) 94, one or more blocks (or circuits) 96, a block (or circuit) 98 and a block (or circuit) 100. The circuits 92 to 100 may represent modules and/or blocks that may be implemented as hardware, software, a combination of hardware and software, or other implementations.

An input signal (e.g., RIN) is shown received by the circuit 100. The signal RIN carries input data (e.g., far-end speech) received from a far-end user. The circuit 100 generates and presents an output signal (e.g., SOUT). The signal SOUT carries output data (e.g., near-end speech) to the far-end user. An output signal (e.g., ROUT) is shown generated by the circuit 100 and transferred to the circuit 98 via the network 92. The signal ROUT conveys processed versions of the data received in the signal RIN. The circuit 98 generates an input signal (e.g., SIN) that is transferred through the network 92 and received by the circuit 100. The signal SIN carries input data (e.g., near-end speech) received from a near-end user. A bidirectional signal (e.g., TEL) is exchanged between the circuit 98 and the circuit 96. The signal TEL carries far-end speech to the near-end user and near-end speech bound for the far-end user. The signal TEL is generally carried on a 2-wire cable.

The network 92 may implement a telephone network. In some embodiments, the network 92 may be a plain old telephone system telephone line (e.g., Public Switched Telephone Network) in other embodiments, the network 92 may implement a private branch exchange (e.g., PBX). Other network designs may be implemented to meet the criteria of a particular application.

The network 92 has a current condition among several possible conditions (or states or modes) at any given time. The possible conditions include, but are not limited to, a talk condition, a listen condition, a double talk condition, a silence condition and a tone condition. The talk condition is known as a far-end talk (or speech) condition. The listen condition is known as a near-end talk (or speech) condition. In some circumstances, two or more of the conditions may exist on the network 92 at the same time (e.g., the tone condition and the talk condition where a far user speaks during the tone condition).

While in the talk condition (far-end speech), the far user is generally speaking and a near user is silent. Since the dominant data on the network 92 in the talk condition originates from the circuit 100, the circuit 100 reduces an actual echo by applying synthesized echo cancellation data, updates (converges) the echo cancellation functionality, detects changes in the echo path of the network 92, combined with the circuit 94, and trains the echo cancellation functionality to match the echo path.

While in the listen (near-end talk) condition, a near user is speaking and the far user is silent. While in the silent condition, both the far user and the near user are silent. If the far user is silent, the signal ROUT generally contains little or no data that could create an echo. Therefore, circuit 100 may stop the updates of the echo cancellation functionality and stop any training in progress. Under the silent condition, the signal SOUT is substantially similar to the signal SIN.

While in the double talk condition, both the far user and the near user are speaking. Since the circuit 100 cannot distinguish far user data from near user data in the signal SIN under the double talk condition, the circuit 100 stops updating the echo cancellation functionality and stops any training in progress. Under the double talk condition, the signal SOUT is substantially similar to the near end talker signal after the estimation of the echo of the signal ROUT has been subtracted, with some possible residual of the un-cancelled echo. In some situations, the echo cancellation continues while in the double talk condition as the circuit 100 may reasonably estimate the echo components in the signal SIN caused by the outgoing data in the signal ROUT. While in the tone condition, the signal TEL generally conveys a continuous tone to the network 92 via the circuit 98. While the tone is present on the network 92, the circuit 100 stops the updating of the echo cancellation functionality and stops any training that may be in progress.

The circuit 94 is shown implementing a central office circuit. The central office 94 communicates with one or more local circuits 96 via one or more signals TEL. The central office 94 is operational to convert between a 2-write interface connection to the circuit 96 and a 4-wire interface connection to the network 92.

The circuit 96 is shown implementing a telephone. The circuit 96 communicates with the central office 94 via the signal TEL. The circuit 96 is considered the near end of the system 90.

The circuit 98 is shown implementing a converter circuit. The circuit 98 resides within the central office 94. The circuit 98 is operational to convert between the 4-wire interface of the network 92 and the 2-wire interface to the circuit 96. The circuit 98 is also operational to convert between a digital domain of the network 92 and an analog domain of the circuit 96.

The circuit 100 is shown implementing an echo canceller circuit. The circuit 100 is operational to transfer data between a far-end user and the network 92, filter the data, perform network echo cancellation on the send data as received in the signal SIN, update the echo cancellation functionality to converge with the current echo characteristics of the circuit 98 and the network 92, train the echo cancellation functionality to learn new echo characteristics and detect echo path changes in the circuit 98 and/or the network 92. The echo cancellation includes generating an intermediate signal by expanding input data received in the signal SIN subjected to a quantization in the circuit 98, generating another intermediate signal based on input data received in the signal RIN, where the other intermediate signal approximates an echo in the signal SIN caused by the signal RIN, and generating an additional intermediate signal by companding the other intermediate signal to compensate for the quantization of the signal SIN. In some embodiments, the circuit 100 is implemented as one or more integrated circuits (or chips or dies).

Figure 2:
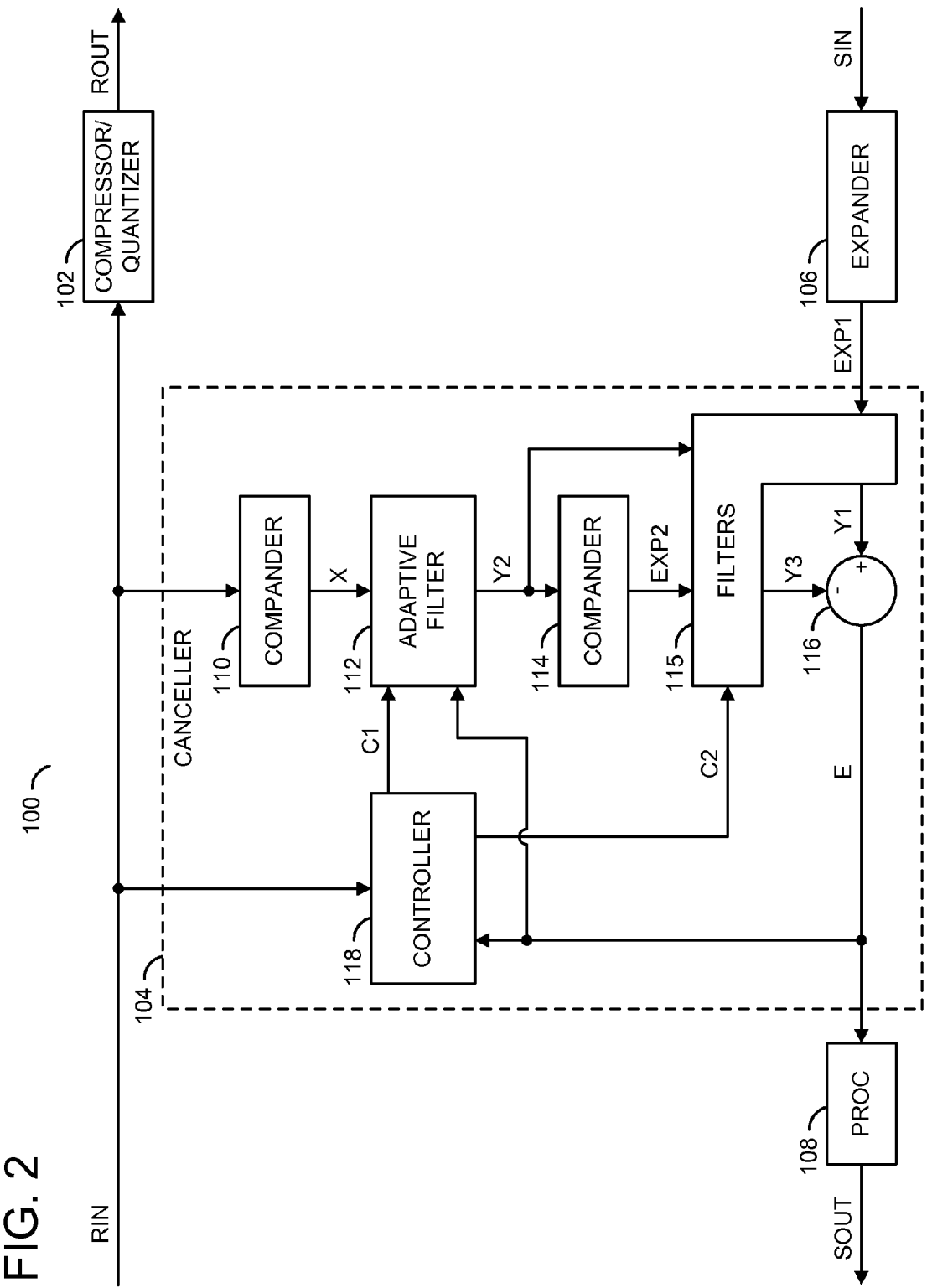
FIG. 2 is a detailed block diagram of a canceller circuit in accordance with an embodiment of the invention.

Referring to FIG. 2, a detailed block diagram of an example implementation of the circuit 100 is shown in accordance with an embodiment of the invention. The circuit (or apparatus or device or integrated circuit) 100 generally comprises a block (or circuit) 102, a block (or circuit) 104, a block (or circuit) 106 and a block (or circuit) 108. The circuit 104 generally comprises a block (or circuit) 110, a block (or circuit) 112, a block (or circuit) 114, a block (or circuit) 115, a block (or circuit) 116 and a block (or circuit) 118. The circuits 102 to 118 may represent modules and/or blocks that may be implemented as hardware, software, a combination of hardware and software, or other implementations.

The signal RIN is shown being received by the circuits 102, 110 and 118. The signal ROUT is generated and presented by the circuit 102. The circuit 106 is shown receiving the signal SIN. The signal SOUT is generated and presented by the circuit 108.

A signal (e.g., EXP1) is shown being generated by the circuit 106 and transferred to the circuit 115. The signal EXP1 is an intermediate signal that carries expanded data as received in the signal SIN. A signal (e.g., Y1) is shown being generated by the circuit 115 and received by the circuit 106. The signal Y1 is a filtered version of the signal EXP1. The circuit 116 generates a signal (e.g., E) received by the circuit 108, 112 and 118. The signal E conveys error data caused by an echo during the far-end talk condition and near-end speech during a near-end talk condition, a double talk condition and/or a tone condition.

A signal (e.g., X) is shown being generated by the circuit 110 and transferred to the circuit 112. The signal X is an intermediate signal that carries a companded version of the data in the signal RIN. The circuit 112 generates a signal (e.g., Y2) transferred to the circuits 114 and 115. The signal Y2 is an intermediate signal that carries a filtered version of the data from the signal X. A signal (e.g., EXP2) is shown being generated by the circuit 114 and received by the circuit 115. The signal EXP2 is an intermediate signal that carries companded versions of the data in the signal Y2. The circuit 115 is shown generating a signal (e.g., Y3) that is transferred to the circuit 116. The signal Y3 is either a filtered version of the signal EXP2 or the signal Y2. The circuit 118 is shown generating a signal (e.g., C1) received by the circuit 112. The signal C1 conveys control information that adjusts filtering operations in the circuit 112. The circuit 118 also generates a signal (e.g., C2) received by the circuit 115. The signal C2 is a control signal used to selectively bypass/not bypass the companding operations of the circuit 114.

During far talking, damage to the signal SIN caused by the system 90 is predictable because the damage is caused by a quantization through a known scheme. All other transfer characteristics between a digital-to-analog converter and an analog-to-digital converter in the central office 94 are linear transfer functions modeled by the adaptive filter of the circuit 112.

The circuit 102 is shown implementing a compresser/quantizer circuit. The circuit 102 is operational to compress the data received in the signal RIN to generate the signal ROUT. The compression function includes a quantization of the data per either the A-law technique or the µ-law technique.

The circuit 104 is shown implementing an echo canceller (e.g., ECAN) circuit. The circuit 104 is operational to detect the characteristics of the circuit 98 and/or the network 92, model an echo path of the circuit 98 and the network 92, cancel echoes within the signal SIN created due to data in the signal ROUT, update the echo cancellation functionality and train the echo cancellation functionality. The echo cancelled data is presented in the signal E to the circuit 108.

The circuit 106 is shown implementing an expander circuit. The circuit 106 is operational to expand the data received in the signal SIN to generate the signal Y1. The expansion function generally reverses the compression/quantizing function performed by the circuit 98.

The circuit 108 is shown implementing a processor circuit. In some embodiments, the circuit 108 implements a nonlinear processor. The circuit 108 is operational to provide nonlinear residual echo cancellation of whatever echo remains in the signal E.

The circuit 110 is shown implementing a compander circuit. The circuit 110 is operational to compress and subsequently expand the data in the signal RIN to generate the signal X. The compression function includes a quantization of the data per either the A-law technique or the µ-law technique. Including the circuit 110 in the circuit 100 can result in an improvement of approximately 3 db in the echo return loss enhancement compared with a system without the circuit 110. In some situations, the signal RIN may already have experienced the correct quantization that matches the effects of circuit 102.

The circuit 112 is shown implementing an adaptive filter circuit. The circuit 112 is operational to filter the data received in the signal X to generate a synthesized echo in the signal Y2 that approximately mimics the echo caused by the circuit 98 and the network 92. The adaptive filtering is generally based on the tap values in the circuit 112 and a step size value, and other adaptation controls, received in the signal C1 and the error values received in the signal E.

The circuit 114 is shown implementing another compander circuit. The circuit 114 is operational to compress and subsequently expand the data in the signal Y2 to generate the signal Y3. The companding in the circuit 114 matches the quantization seen on the signal SIN by applying the same quantization to the signal Y2. Therefore, the residual quantization error on the signal E can be reduced in the circuit 116 to a greater extent than in common techniques. The compression function includes a quantization of the data per either the A-law technique or the µ-law technique. The circuit 114 is also operational to bypass the companding operation as commanded by control information in the signal C2. The control signal C2 might also be asserted during a double-talk, near-talk, silence or tone condition.

The circuit 115 is shown implementing a filter circuit. The circuit 115 is operational to create the signal Y1 by filtering the signal EXP1. The circuit 115 is also operational to create the signal Y3 by filtering the signal EXP2 or the signal Y2. Control of generation of the signal Y3 is provided by the signal C2.

The circuit 116 is shown implementing a subtracter circuit. The circuit 116 is operational to generate a difference between the synthesized echo received in the signal Y3 and the actual echo as received in the signal Y1. The difference is an error value in the signal E.

The circuit 118 is shown implementing a controller circuit. The circuit 118 is operational to control the overall operations of the circuit 104. The circuit 118 controls the adaptive filter settings of the circuit 112 and the bypass/not bypass setting in the circuit 115 of the compander operation. In some embodiments, the bypass/not bypass of the companding operation in the circuit 114 is determined in response to a ratio of an average energy of the error signal E to an average energy of the signal Y1. In other embodiments, the bypass/not bypass determination for the companding is made in response to talk on both the signal SIN and the signal RIN.

Figure 3:
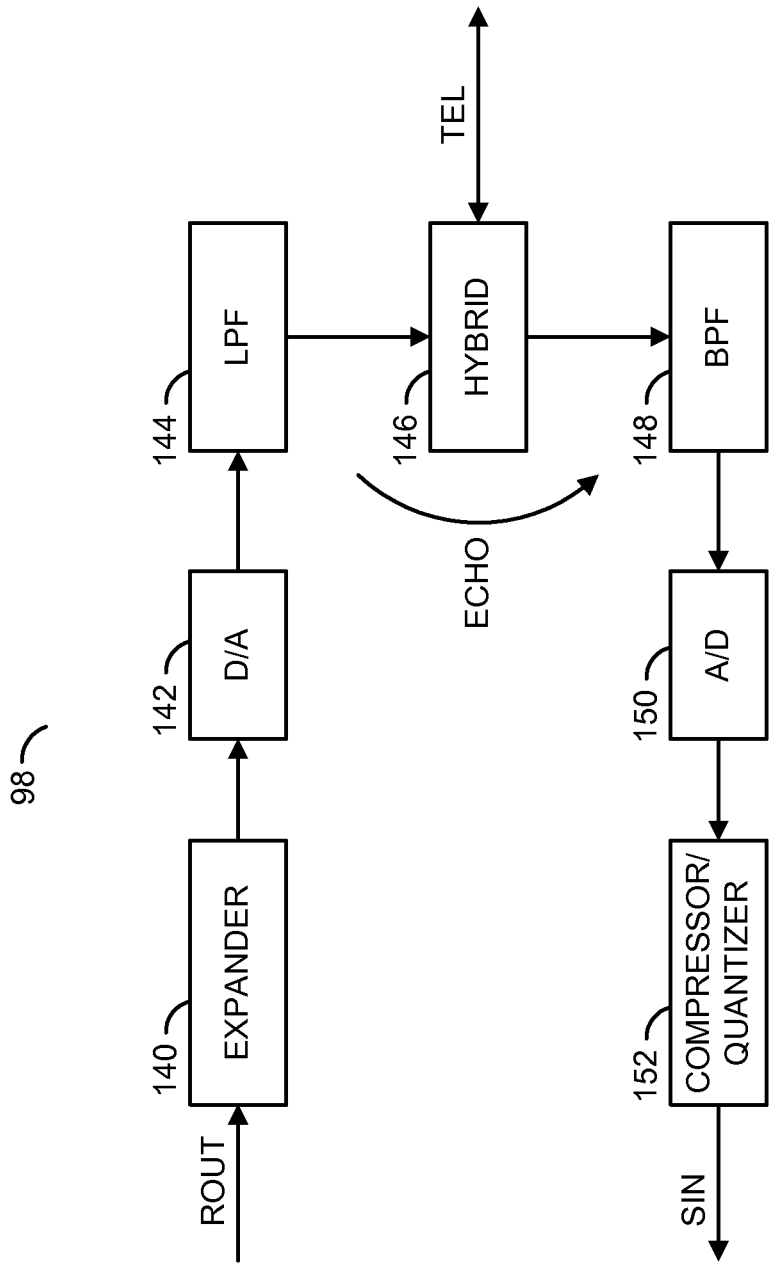
FIG. 3 is a detailed block diagram of a converter circuit.

Referring to FIG. 3, a detailed block diagram of an example implementation of the circuit 98 is shown. The circuit 98 generally comprises a block (or circuit) 140, a block (or circuit) 142, a block (or circuit) 144, a block (or circuit) 146, a block (or circuit) 148, a block (or circuit) 150 and a block (or circuit) 152. The circuits 140 to 152 may represent modules and/or blocks that may be implemented as hardware, software, a combination of hardware and software, or other implementations.

The signal ROUT is shown being received by the circuit 140. The signal TEL is exchanged with the circuit 146. The signal SIN is generated and transmitted by the circuit 152. The echo is created across the circuit 146.

A signal-to-noise ratio at the central office 94 in the analog section is higher than the 38 dB created by the µ-law/A-law quantization. Therefore, the companding quantization from the circuits 140 and 152 constrains the overall signal-to-noise ratio and thus the echo cancellation performance.

The circuit 140 is shown implementing an expander circuit. The circuit 140 is operational to expand the data received in the signal ROUT. The expansion function generally reverses the compression/quantizing function performed by the circuit 102.

The circuit 142 is shown implementing a digital-to-analog (e.g., D/A) converter circuit. The circuit 142 is operational to convert the expanded data created by the circuit 140 into an analog signal. The data entering the circuit 142 is in the digital domain. The data leaving the circuit 142 is in the analog domain. The analog data is presented to the circuit 144. In some embodiments, the low pass filter function of the circuit 144 may be partly digital and partly analog, and so may span both sides of the circuit 142.

The circuit 144 is shown implementing a low pass filter (e.g., LPF) circuit. The circuit 144 is operational to low-pass filter the data received from the circuit 142. The low-pass filtering provides an anti-aliasing feature to the circuit 98.

The circuit 146 is shown implementing a hybrid circuit. The circuit 146 is operational to route the receive data from the circuit 144 to the signal TEL and route the send data in the signal TEL to the circuit 148. In some embodiments, the circuit 146 is implemented as a normal 4-wire to 2-wire hybrid circuit. The 2-wire interface generally connects to the telephone lines between the central office 94 and the one or more telephones 96. Half of the 4-wire interface receives the data carried in the signal ROUT. The other half of the 4-wire interface presents data to the signal SIN. In some situations, the circuit 146 may leak some received data from the signal ROUT to the signal SIN thereby creating the echo. In common schemes, multiple circuits 146 may be distributed throughout the system 90. In some embodiments, one or more additional circuits 146 may exist between the circuits 100 and 96. Each of the multiple circuits 146 creates a corresponding echo.

The circuit 148 is shown implementing a band pass filter (e.g., BPF) circuit. The circuit 148 is operational to band-pass filter the data received from the circuit 146. The band-pass filtering provides an anti-aliasing feature to the circuit 98. In some embodiments, the circuit 148 also removes power line frequencies (e.g., 60 Hertz) that may couple into the telephone lines. In some embodiments, the circuit 148 may be partly analog and partly digital and therefore, span across the circuit 150.

The circuit 150 is shown implementing an analog-to-digital (e.g., A/D) converter circuit. The circuit 150 is operational to digitize the analog data received from the circuit 148. The digitized data is presented to the circuit 152.

The circuit 152 is shown implementing a compresser/quantizer circuit. The circuit 152 is operational to compress the data received from the circuit 150 to generate the signal SIN. The compression function includes a quantization of the data per either the A-law technique or the µ-law technique.

Figure 4:
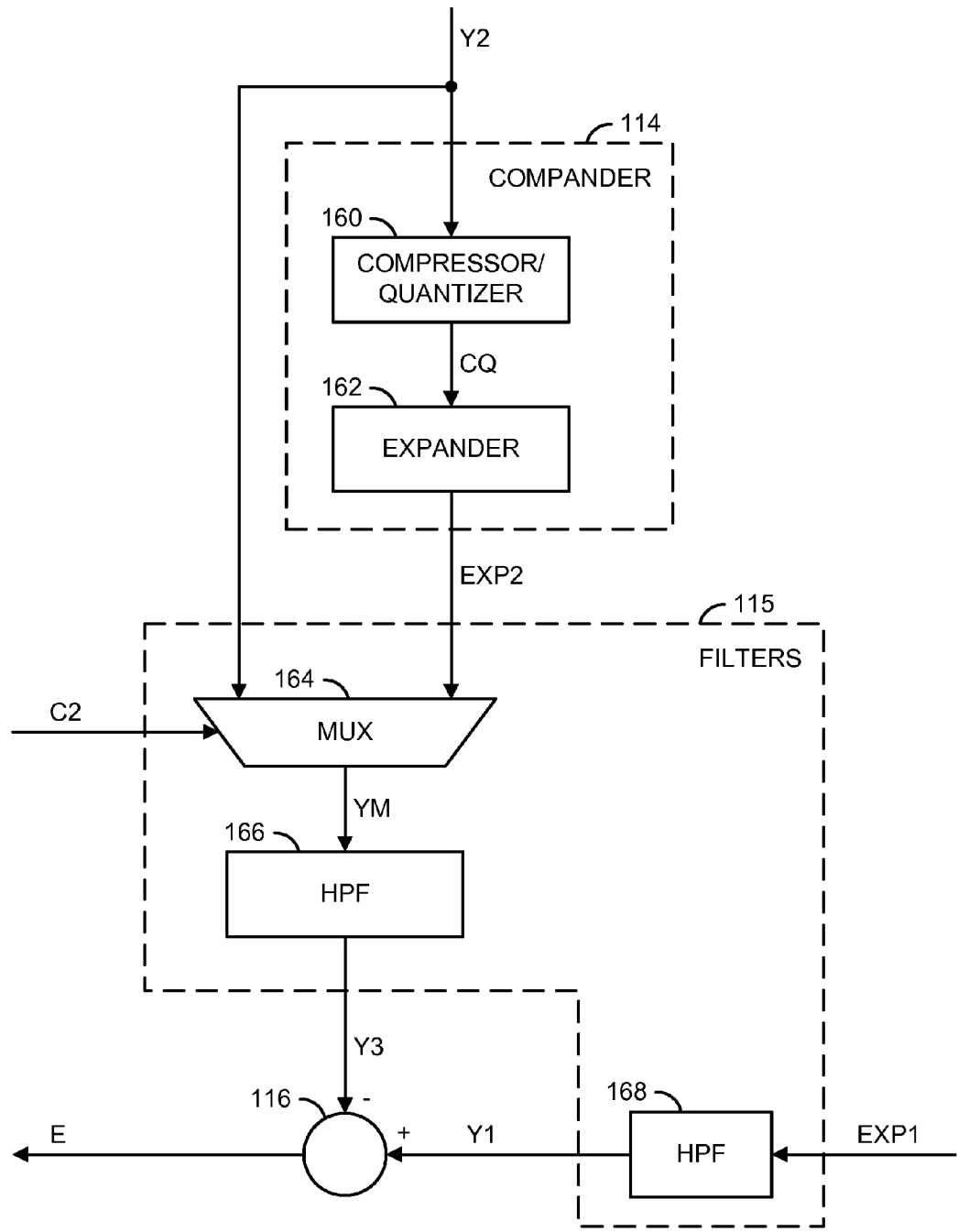
FIG. 4 is a detailed block diagram of a compander circuit and a filter circuit.

Referring to FIG. 4, a detailed block diagram of an example implementation of the circuits 114 and 115 is shown. The circuit 114 generally comprises a block (or circuit) 160 and a block (or circuit) 162. The circuit 115 generally comprises a block (or circuit) 164, a block (or circuit) 166 and a block (or circuit) 168. The circuits 160 to 168 may represent modules and/or blocks that may be implemented as hardware, software, a combination of hardware and software, or other implementations.

The signal Y2 is shown being received by the circuits 160 and 164. A compressed signal (e.g., CQ) is generated by the circuit 160 and transferred to the circuit 162. The signal CQ conveys a compressed and quantized version of the data in the signal Y2. A signal (e.g., EXP2) is generated by the circuit 162 and presented to the circuit 164. The signal EXP2 conveys an expanded version of the compressed/quantized data in the signal CQ. A signal (e.g., YM) is shown being generated by the circuit 164 and received by the circuit 166. The signal YM is an intermediate signal that selectively carries data from the signal Y2 or the signal EXP2, depending on the control information in the signal C2. The signal Y3 is shown being generated by the circuit 166. The circuit 168 is shown receiving the signal EXP1. The signal Y1 is shown being generated by the circuit 168.

The circuit 160 is shown implementing a compresser/quantizer circuit. The circuit 160 is operational to compress the data received in the signal Y2 to generate the signal CQ. The compression function includes a quantization of the data per either the A-law technique or the µ-law technique.

The circuit 162 is shown implementing an expander circuit. The circuit 162 is operational to expand the data received in the signal CQ to generate the signal EXP2. The expansion function generally reverses the compression/quantizing function performed by the circuit 160.

The circuit 164 is shown implementing a multiplexer circuit. The circuit 164 is operational to selectively multiplex either the signal Y2 or the signal EXP2 to the signal YM. The selection between the signal Y2 and EXP2 is controlled by the signal C2.

The circuit 166 is shown implementing a high pass filter. The circuit 166 is operational to generate the signal Y3 by high-pass filtering the signal YM.

The circuit 168 is shown implementing a high pass filter. The circuit 168 is operational to generate the signal Y1 by filtering the signal EXP1. The circuit 168 typically exists between the signal SIN and the signal Y1 in the echo canceller (e.g., circuit 104). The circuit 166 provides similar changes in the signal Y3 as the circuit 168 does in the signal Y1.

The quantization process on the signal Y2 is enabled during good performance after ordinary convergence has been achieved. A measurement of performance (e.g., PERF) is achieved by monitoring a ratio of the signal energy difference between the signal E and the signal Y1. The ratio is expressed by formula 1 as follows:

$$\text{PERF} = (\text{average } E^2)/(\text{average } Y1^2) \quad (1)$$

In some embodiments, if the performance value is less than a threshold, the signal Y2 is quantized, expanded and routed through the circuit 164. Otherwise, the companding operation is bypassed using the circuit 164 and the signal Y3 matches the signal Y2. In other embodiments, a best value of the performance is tracked and used for gating the quantization. Using the gating technique allows for a fall-back capability that enables the echo canceller circuit 104 to have at least a conventional performance.

Figure 5:
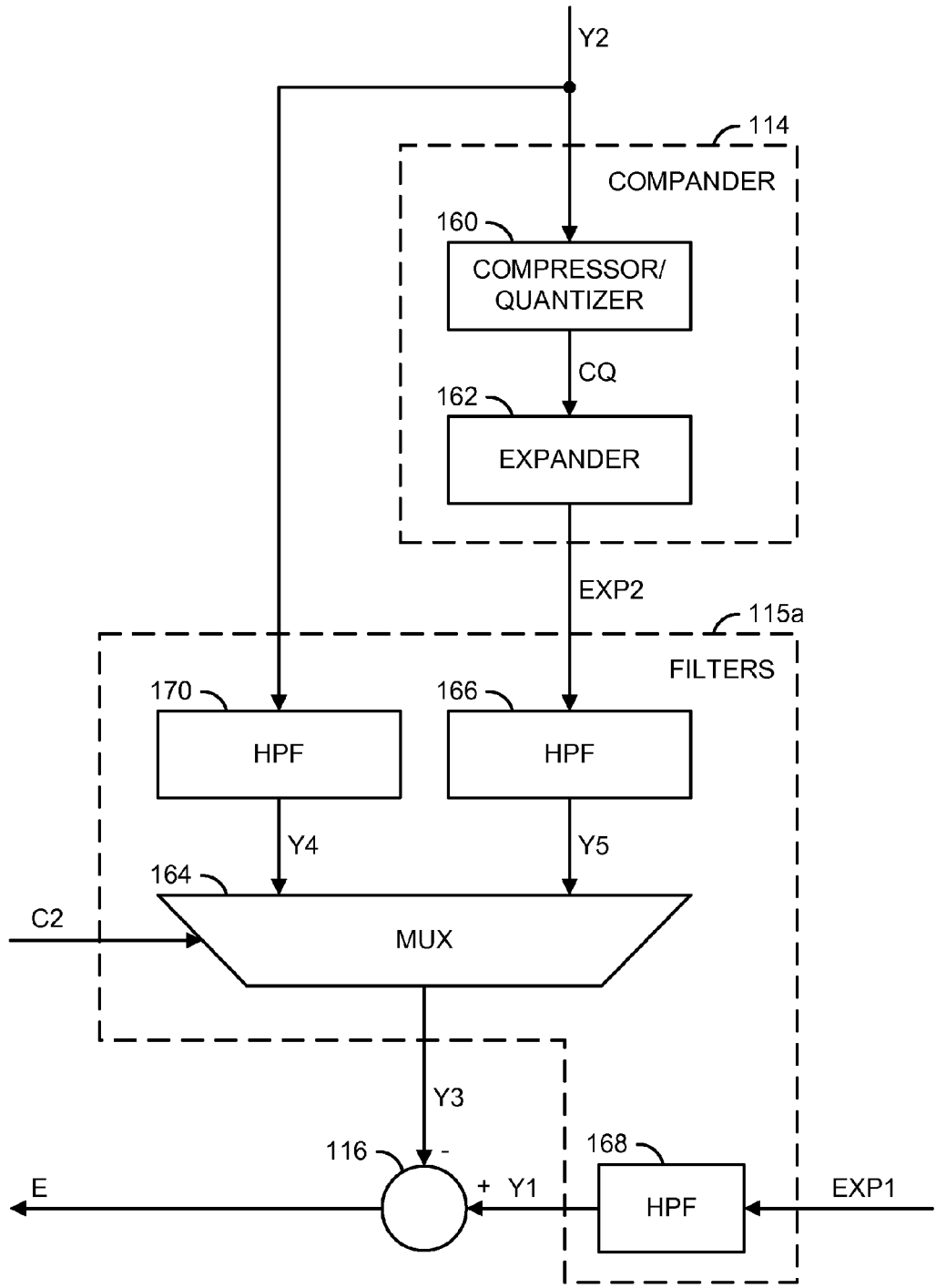
FIG. 5 is a detailed block diagram of the compander circuit and another filter circuit.

Referring to FIG. 5, a detailed block diagram of another example implementation of the circuit 114 and a circuit 115a is shown. The circuit 115a generally comprises the block 164, the block 166, a block (or circuit) 168 and the block 170. The circuits 160 to 170 may represent modules and/or blocks that may be implemented as hardware, software, a combination of hardware and software, or other implementations.

The signal Y2 is shown being received by the circuits 160 and 160. A signal (e.g., Y4) is shown being transferred from the circuit 170 to the circuit 164. The signal EXP2 is shown being received by the circuit 166 from the circuit 162. The circuit 166 generates a signal (e.g., Y5) that is received by the circuit 164.

The circuit 164 is shown implementing the multiplexer circuit. The circuit 164 is operational to selectively multiplex either the signal Y4 or the signal Y5 to the signal Y3. The selection between the signal Y4 and Y5 is controlled by the signal C2.

The circuit 166 is shown implementing the high pass filter. The circuit 166 is operational to generate the signal Y5 by high-pass filtering the signal EXP2. The circuit 166 provides similar changes in the signal Y5 as the circuit 168 does in the signal Y1.

The circuit 170 is shown implementing another high pass filter. The circuit 170 is operational to generate the signal Y4 by high-pass filtering the signal Y2. The circuit 70 provides similar changes in the signal Y4 as the circuit 168 does in the signal Y1.

The circuit 115a operates similar to the circuit 115. In the circuit 115a, the signal Y2 and EXP2 are filtered prior to being multiplexed. The selected filtered signal is presented in the signal Y3 to the circuit 116.

Figure 6:
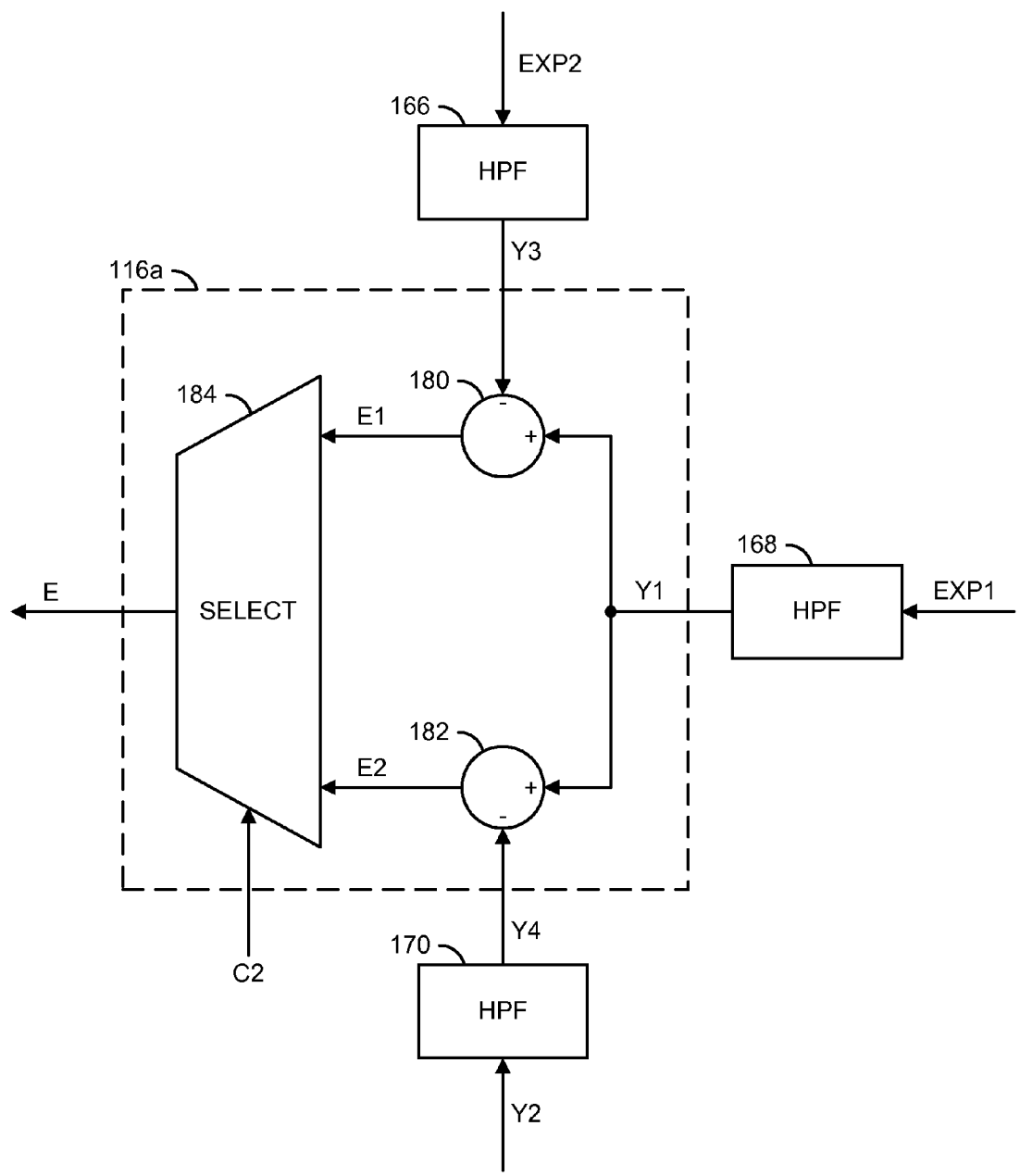
FIG. 6 is a detailed block diagram of a subtracter circuit.

Referring to FIG. 6, a block diagram of an example implementation of a circuit 116a is shown. The circuit 116a is a variation of the circuit 116. The circuit 116a generally comprises a block (or circuit) 180, a block (or circuit) 182 and a block (or circuit) 184. The block 164 is optionally removed from the circuit 115a such that the signal Y3 matches the signal Y5. The circuits 180 to 184 may represent modules and/or blocks that may be implemented as hardware, software, a combination of hardware and software, or other implementations.

The signals Y1 and Y3 are shown being received by the circuit 180. The signal Y1 and a signal Y4 are received by the circuit 182. A signal (e.g., E1) is generated by the circuit 180 and transferred to the circuit 184. A signal (e.g., E2) is generated by the circuit 182 and transferred to the circuit 184. The signal E is generated and presented by the circuit 184.

Each circuit 180 and 182 is shown implementing a subtracter circuit. The circuit 180 is operational to generate a difference between the synthesized echo received in the signal Y3 and the actual echo as received in the signal Y1. The difference is an error value in the signal E1. The circuit 182 is operational to generate a difference between the synthesized echo received in the signal Y4 and the actual echo as received in the signal Y1. The difference is an error value in the signal E2.

The circuit 184 is shown implementing a multiplexer circuit. The circuit 184 is operational to generate the signal E by selecting between the signals E1 and E2. Control of the selection may be governed by the signal C2.

In some situations, the data in the signal Y2 has slight errors because the echo estimate is not completely accurate. Therefore, the erroneous data can be quantized incorrectly. To account for the incorrect quantization, the circuit 180 measures an error between the quantized version of the data in the signal Y3 and the signal Y1 while the circuit 182 measures an error between the unquantized version of the data in the signal Y2 (via the signal Y4) and the signal Y1. The circuit 184 receives both errors in the signal E1 and the alternate signal E2, respectively. The circuit 184 is operational to select the signal with the smaller (or lower) error on a sample-by-sample basis and present the selected data in the signal E.

Double talk in the system 90 is a low probability and/or a limited occurrence. The existence of near-end speech and double talk means that the quantization on the signal SIN is not fully related to the echo production process. To account for the double talk, detection is performed by the circuit 118 in some embodiments. Upon detection to the double talk, the circuits 118 and 164 gate the quantization of the signal Y2, and so the multiple inputs to the subtracter circuit 116 will not be used and only the signal E2 from circuit 182 is calculated. The internal state of the high pass filter is preserved for use with all the possible signals EXP from circuit 162.

Figure 7:
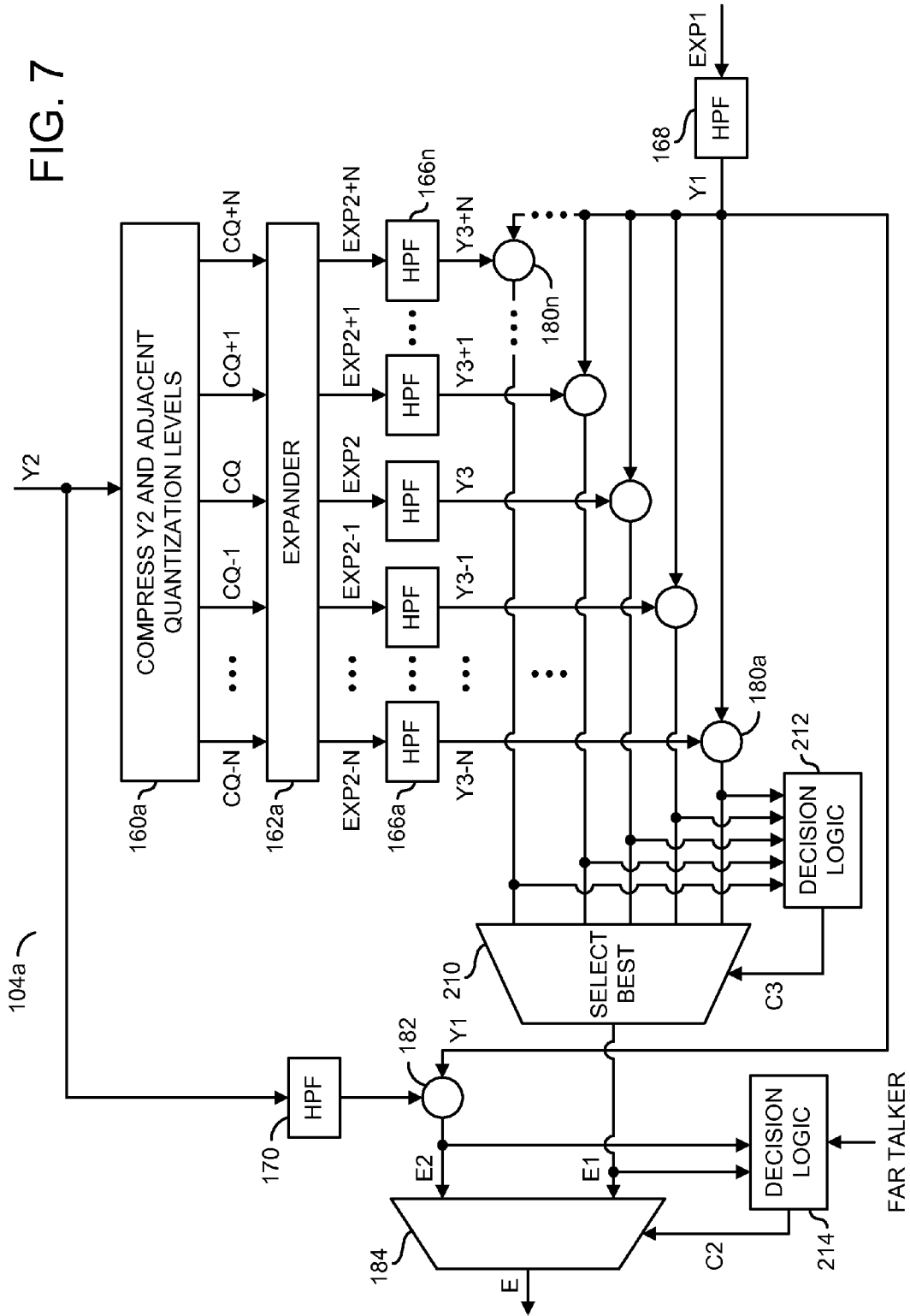
FIG. 7 is a partial block diagram of another canceller circuit.

Referring to FIG. 7, a partial block diagram of another example implementation of a circuit 104a is shown. The circuit 104a generally comprises a block (or circuit) 160a, a block (or circuit) 162a, multiple blocks (or circuits) 166a-166n, the block 168, the block 170, multiple blocks (or circuits) 180a-180n, the circuit 182, the circuit 184, a block (or circuit) 210, a block (or circuit) 212 and a block (or circuit) 214. The circuits 160a to 214 may represent modules and/or blocks that may be implemented as hardware, software, a combination of hardware and software, or other implementations.

The signal Y2 is shown being received by the circuit 160a. Multiple signals (e.g., CQ−N to CQ+N) are shown being generated by the circuit 160a and presented to the circuit 162a. The circuit 162a is shown generating multiple signals (e.g., EXP2−N to EXP2+N) that are transferred to the circuits 166a-166n, respectively. Multiple signals (e.g., Y3−N to Y3+N) are shown being generated by the circuits 166a-166n and transferred to the circuits 180a-180n, respectively. Each circuit 180a-180n receives the signal Y1. Error signals generated by the circuits 180a-180n are shown being received by the circuits 210 and 212. A signal (e.g., C3) is shown being generated by the circuit 212 and transferred to the circuit 210. The signal C3 is a control signal used to select among the error signals generated by the circuits 180a-180n. The signal E1 is generated by the circuit 210.

The signals E1 and E2 are shown being received by the circuit 214. The circuit 214 also receives information about a far talker. The circuit 214 generates the signal C2.

The circuit 160a is shown implementing a compresser/quantizer circuit. The circuit 160a is a variation of the circuit 160. The circuit 160a is operational to compress the data received in the signal Y2 to generate the signals CQ-N to CQ+N. The compression function includes a quantization of the data per either the A-law technique or the μ-law technique. In some embodiments, the circuit 160a creates 2N+1 (e.g., N≥1) outputs from the quantizer producing the multiple signals CQ−N to CQ+N, quantized at levels adjacent to the most likely level chosen by the circuit 160a for the signal Y2.

The circuit 162a is shown implementing an expander circuit. The circuit 162a is a variation of the circuit 162. The circuit 162a is operational to expand the data received in the signals CQ−N to CQ+N to generate the signals EXP2−N to EXP2+N. The expansion functions generally reverse the compression/quantizing functions performed by the circuit 160a.

Each circuit 166a-166n is shown implementing a high pass filter. Each circuit 166a-166n may be a copy of the circuit 166. The circuits 166a-166n are operational to generate the signals Y3−N to Y3+N by high-pass filtering the signals EXP2−N to EXP2+N, respectively.

Each circuit 180a-180n is shown implementing a subtracter circuit. Each circuit may be a copy of the circuit 180. The circuits 180a-180n are operational to generate differences between the synthesized echos received in the signals Y3−N to Y3+N and the actual echo as received in the signal Y1. The differences are presented to the circuit 210.

The circuit 210 is shown implementing a multiplexer circuit. The circuit 210 is operational to generate the signal E1 by selecting among the differences (error signals) generated by the circuits 180a-180n. Control of the selection may be provided from the circuit 212 via the signal C3.

The circuit 212 is shown implementing a decision logic circuit. The circuit 212 is operational to compare the error magnitudes of the quantized difference signals generated by the circuits 180a-180n and choose the quantized difference signal with a least error magnitude to use as the signal E1, as measured sample-by-sample. The chosen quantized difference signal may be identified to the circuit 210 in the signal C3. In some embodiments, the circuit 212 forms part of the circuit 118. In some embodiments, the signal C3 forms part of the signal C2.

The circuit 214 is shown implementing another decision logic circuit. The circuit 214 is operational to choose signals E1 or E2 with the least error magnitude to use as the signal E, as measured sample-by-sample. The chosen quantized difference signal may be identified to the circuit 184 in the signal C2. In some embodiments, the circuit 214 forms part of the circuit 118.

The signal Y2 is presented to the circuit 160a and multiple versions of the signals EXP2−N to EXP2+N are generated by the circuit 162a. The signal EXP2 in FIG. 7 is the same as the signal EXP2 in FIGS. 4 and 5. The other signals EXP2−N to EXP2−1 and EXP2+1 to EXP2+N are generated based on the adjacent (different) levels of quantization. Since μ-law quantization and A-law quantization have different quantization steps based on the amplitude of the signal Y2, the difference (i) between the values in the signals EXP2−1 and EXP2 and (ii) between the values in the signals EXP2 and EXP2+1 will depend on a value of the signal Y2. For instance, if the value in the signal Y2 is near full amplitude, the adjacent quantization steps will be many (e.g., 1024) units apart for scaling. If the amplitude of the signal Y2 is rather small, the steps may be a few (e.g., 8) units apart. The number of adjacent steps will typically be odd, allowing for the central signal EXP2 and steps of ±N on each side (e.g., signals EXP2−N to EXP2−1 and EXP+1 to EXP+N)

Each signal EXP2−N to EXP2+N is transferred to a respective high pass filter (e.g., the circuits 166a-166n) as one or more internal states of the high pass filters depend on the output for infinite impulse response filter implementations. Each filtered value in the signals Y3−N to Y3+N is subtracted from a value in the signal Y1 by the circuits 180a-180n. The values of the resulting errors are compared in the circuit 212 to decide which gives the least error. The signal with the least error is selected by the circuit 212 and multiplexed through the circuit 210 as the signal E1. At the same time, the internal states of the particular high pass filter whose output produced the best result is copied to all the other high pass filters, including the high pass filter circuit for Y2, in order to provide the best starting state for the next output.

The logic used for the circuit 214 uses the far talker input to help make the decision as to whether the error signal E1 will be overridden and thus only the error signal E2 can be selected. If far talker is true, the signal E1 or the signal E2 is selected based on the best performance. If the signal E2 is chosen based on the far talker or on the best performance, the internal state of the high pass filter for the signal Y2 is copied to all the other high pass filters. Table I shows the logic used for the decision making for the signal C2 for both the single and multiple quantizing cases as follows.

TABLE I

| Inputs | | | Output |
| --- | --- | --- | --- |
| Far Talker | Signal E1 | Signal E2 | Signal C2 |
| True | |E1| < |E2| | |E1| < |E2| | Select E1 |
| True | |E1| > |E2| | |E1| > |E2| | Select E2 |
| False | Don't care | Don't care | Select E2 |

In some embodiments, where the high pass filters are implemented as infinite impulse response filters, the state variables in the high pass filter of each path (e.g., the circuits 166, 166a-166n and the circuit 170) should be updated with the variables found in the path producing the best result. The circuit 168 will always have the correct state variables since no decision would affect the content therein.

Figure 8:
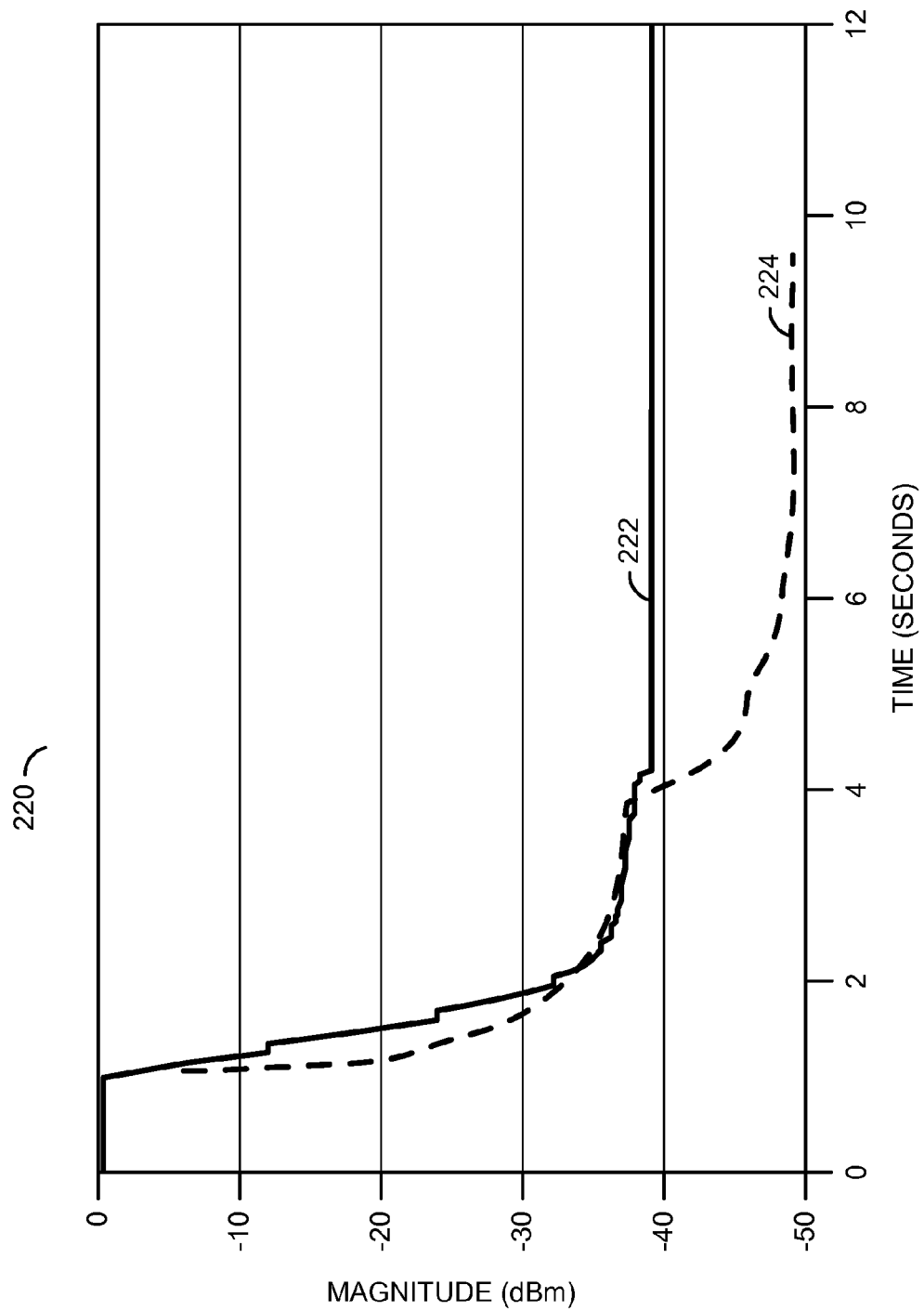
FIG. 8 is a graph of a simulation of a best inverse echo return loss enhancement performance.

Referring to FIG. 8, a graph 220 of an example simulation of a best inverse echo return loss enhancement performance is shown. A curve 222 illustrates the best inverse echo return loss enhancement as a function of time. The curve 222 illustrates an inverse echo return loss enhancement performance of less than −38 dB that settles after approximately 4 seconds. An absolute inverse echo return loss enhancement in the simulation is less than −42 dB. A curve 224 illustrates an average inversed echo return loss enhancement performance of the canceller with the quantization compensation turned on. The average inversed echo return loss enhancement performance approaches −47 dB of cancellation by selecting between Y2 and Y3. The performance simulation provides better than 60 dB, reduction in echo, using three or more quantization levels.

The functions performed by the diagrams of FIGS. 1-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a control circuit configured to generate one or more selective control signals;
    a first circuit configured to generate a first intermediate signal by expanding a first input signal subjected to a quantization; and
    a second circuit configured to (i) generate a second intermediate signal based on a second input signal, wherein said second intermediate signal approximates an echo in said first input signal caused by said second input signal, and (ii) generate a third intermediate signal by selectively companding said second intermediate signal to compensate said quantization of said first input signal, said selective companding a result of receiving a selective control signal, wherein said first circuit and said second circuit are implemented as hardware or a combination of hardware and software.

2. The apparatus according to claim 1, wherein said second intermediate signal is generated by compressing and expanding said second input signal, and when said companding is selected said companding includes (i) generating a compressed signal by compressing said second intermediate signal and (ii) generating said third intermediate signal by expanding said compressed signal.

3. The apparatus according to claim 1, wherein said second circuit is further configured to generate an error signal by subtracting said third intermediate signal from said first intermediate signal to cancel said echo.

4. The apparatus according to claim 3, wherein said second circuit is further configured to filter said third intermediate signal prior to said subtracting from said first intermediate signal.

5. The apparatus according to claim 3, wherein said second circuit is further configured to bypass said companding of said second intermediate signal in response to the selective control signal, the selective control signal based on a ratio of an average energy of said error signal to an average energy of said first intermediate signal.

6. The apparatus according to claim 3, wherein said second circuit is further configured to (i) generate an alternate signal by subtracting said second intermediate signal from said first intermediate signal and (ii) select a smaller of said error signal and said alternate signal.

7. The apparatus according to claim 1, wherein said second circuit is further configured to bypass said companding of said second intermediate signal in response to the selective control signal, the selective control signal based on talk on both said first input signal and said second input signal.

8. The apparatus according to claim 1, wherein (i) said second circuit is further configured to generate a fourth intermediate signal by companding said second input signal and (ii) said second intermediate signal is generated by filtering said fourth intermediate signal.

9. The apparatus according to claim 1, wherein the selective control signal is a first selective control signal, and wherein said second circuit is further configured to (i) generate a plurality of error signals based on multiple versions of said third intermediate signal, each of said versions representing a different level of quantization, and (ii) select, upon receiving a second selective control signal, one of said error signals based on a plurality of error magnitudes in said error signals.

10. The apparatus according to claim 1, wherein said apparatus is implemented as one or more integrated circuits.

11. A method for echo cancellation with quantization compensation, comprising the steps of:
    generating a first intermediate signal by expanding a first input signal subjected to said quantization;
    generating a second intermediate signal based on a second input signal, wherein said second intermediate signal approximates an echo in said first input signal cause by said second input signal;
    generating one or more selective control signals; and
    generating a third intermediate signal by selectively companding said second intermediate signal to compensate said quantization of said first input signal, wherein said selective companding is based on a selective control signal.

12. The method according to claim 11, wherein said second intermediate signal is generated by compressing and expanding said second input signal, and when said companding is selected said companding includes (i) generating a compressed signal by compressing said second intermediate signal and (ii) generating said third intermediate signal by expanding said compressed signal.

13. The method according to claim 11, further comprising the step of:
    generating an error signal by subtracting said third intermediate signal from said first intermediate signal to cancel said echo.

14. The method according to claim 13, further comprising the step of:
    filtering said third intermediate signal prior to said subtracting from said first intermediate signal.

15. The method according to claim 13, further comprising the step of:
    bypassing said companding of said second intermediate signal in response to a ratio of an average energy of said error signal to an average energy of said first intermediate signal, the selective control signal based on the ratio.

16. The method according to claim 13, further comprising the steps of:
    generating an alternate signal by subtracting said second intermediate signal from said first intermediate signal; and
    selecting a smaller of said error signal and said alternate signal.

17. The method according to claim 11, further comprising the step of:
    bypassing said companding of said second intermediate signal in response to talk on both said first input signal and said second input signal, the selective control signal based on the talk.

18. The method according to claim 11, further comprising the step of:
    generating a fourth intermediate signal by companding said first second input signal, wherein said second intermediate signal is generated by filtering said fourth intermediate signal.

19. The method according to claim 11, further comprising the steps of:
  generating a plurality of error signals based on multiple versions of said third intermediate signal, each of said versions representing a different level of quantization; and
  selecting one of said error signals based on a plurality of error magnitudes in said error signals.

20. An echo canceller circuit comprising:
  an exapander block configured to generate a first intermediate signal by expanding a first input signal subjected to a quantization, said quantization being according to A-law or μ-law to reduce bandwidth required to transmit said first input signal;
  a first compander block and a filter block in communication with said expander block to generate a second intermediate signal based on a second input signal, wherein said first compander block compresses and expands said second input signal to generate said second intermediate signal, and wherein said second intermediate signal approximates an echo in said first input signal caused by said second input signal; and
  a second compander block in communication with first compander block and said filter block to generate a third intermediate signal by companding said second intermediate signal to compensate said quantization of said first input signal, and wherein said expander block, said first compander block, said filter block and said second compander block are implemented as hardware or a combination of hardware and software.

* * * * *